US011859570B2

(12) United States Patent
Joseph et al.

(10) Patent No.: US 11,859,570 B2
(45) Date of Patent: Jan. 2, 2024

(54) CAMSHAFT TOOTHED WHEEL AND SYNCHRONIZATION METHOD USING SUCH A WHEEL

(71) Applicant: VITESCO TECHNOLOGIES GMBH, Regensburg (DE)

(72) Inventors: Fabien Joseph, Toulouse (FR); Stéphane Eloy, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 17/793,228

(22) PCT Filed: Feb. 15, 2021

(86) PCT No.: PCT/EP2021/053593

§ 371 (c)(1),
(2) Date: Jul. 15, 2022

(87) PCT Pub. No.: WO2021/165181

PCT Pub. Date: Aug. 26, 2021

(65) Prior Publication Data

US 2023/0063945 A1 Mar. 2, 2023

(30) Foreign Application Priority Data

Feb. 19, 2020 (FR) ...................................... 2001669

(51) Int. Cl.
*F02D 41/00* (2006.01)
*F02D 13/02* (2006.01)
(Continued)

(52) U.S. Cl.
CPC .............. *F02D 41/009* (2013.01); *F01L 1/46* (2013.01); *F02D 13/0215* (2013.01);
(Continued)

(58) Field of Classification Search
CPC ........ F01L 1/047; F01L 1/46; F01L 2013/111; F01L 2013/113; F01L 2201/00; F01L 2820/041; F01L 2820/042; F02D 41/009
(Continued)

(56) References Cited

U.S. PATENT DOCUMENTS

| | | | |
|---|---|---|---|
| 6,035,826 | A | 3/2000 | Matsuoka |
| 6,474,278 | B1 | 11/2002 | Davis et al. |

(Continued)

FOREIGN PATENT DOCUMENTS

| | | |
|---|---|---|
| DE | 102011089414 A1 | 6/2013 |
| JP | 11-107842 | 4/1999 |

(Continued)

OTHER PUBLICATIONS

International Search Report for PCT/EP2021/053593, dated Apr. 1, 2021, 4 pages.

(Continued)

*Primary Examiner* — Jorge L Leon, Jr.
(74) *Attorney, Agent, or Firm* — NIXON & VANDERHYE

(57) ABSTRACT

A toothed wheel forming a target for a camshaft position sensor includes a circular body provided with two opposite main faces and is provided on its circumference with teeth. The series of teeth includes eight teeth, each tooth having, for a given first direction of rotation of the wheel, a rising edge and a falling edge and two neighboring teeth being separated by a recessed part. The edges of a first type, rising or falling, are evenly distributed at the periphery of the toothed wheel. The angular length of the recessed parts is greater than or equal to arctan(Llow/R)°CAM, where R is the radius and Llow is the minimum distance between two teeth to detect a low level, except for one recessed part, and the angular length of a tooth is greater than arctan(Lhigh/
(Continued)

R)°CAM, except for one tooth, where Lhigh is the minimum length of a tooth allowing detection.

20 Claims, 2 Drawing Sheets

(51) Int. Cl.
*F01L 1/46* (2006.01)
*F01L 1/047* (2006.01)
*F01L 13/00* (2006.01)

(52) U.S. Cl.
CPC .......... *F01L 1/047* (2013.01); *F01L 2013/111* (2013.01); *F01L 2013/113* (2013.01); *F01L 2201/00* (2013.01); *F01L 2820/041* (2013.01); *F01L 2820/042* (2013.01); *F02D 2041/0092* (2013.01)

(58) Field of Classification Search
USPC ........................................................ 123/90.17

See application file for complete search history.

(56) References Cited

U.S. PATENT DOCUMENTS

| | | | | |
|---|---|---|---|---|
| 9,273,656 | B2 | 3/2016 | Schule et al. | |
| 10,634,077 | B2 | 4/2020 | Mazenc | |
| 2005/0229879 | A1* | 10/2005 | McCabe | F01L 1/344 123/90.15 |
| 2007/0164732 | A1 | 7/2007 | Voisine et al. | |
| 2014/0360254 | A1 | 12/2014 | Deringer et al. | |
| 2018/0372010 | A1* | 12/2018 | Zouboff | F02D 41/009 |
| 2021/0222637 | A1 | 7/2021 | Ibanez et al. | |

FOREIGN PATENT DOCUMENTS

| | | | |
|---|---|---|---|
| WO | 2012007307 | A1 | 1/2012 |
| WO | 2017012706 | A1 | 1/2017 |
| WO | 2020016342 | A1 | 1/2020 |

OTHER PUBLICATIONS

Written Opinion of the ISA for PCT/EP2021/053593, dated Apr. 1, 2021, 6 pages.
Office Action issued in Chinese Patent Application No. 202180015348.6 dated Oct. 31, 2023.

* cited by examiner

CAMSHAFT TOOTHED WHEEL AND SYNCHRONIZATION METHOD USING SUCH A WHEEL

CROSS REFERENCE TO RELATED PRIORITY APPLICATIONS

This application is the U.S. national phase of International Application No. PCT/EP2021/053593, filed Feb. 15, 2021, which designated the U.S. and claims priority to FR FR2001669 filed Feb. 19, 2020, the entire contents of each of which are hereby incorporated by reference.

BACKGROUND OF THE INVENTION

Field of the Invention

The present application relates to a toothed wheel for a camshaft and to a synchronization method using such a wheel.

Description of the Related Art

In an operating cycle of a four-stroke internal combustion engine, it is necessary to know the position of the crankshaft with precision in order to be able to synchronize various actions such as fuel injection, spark plug control, management of timing members, etc. This makes it possible to optimize the efficiency of combustion and reduce fuel consumption and harmful emissions. In other words, an internal combustion engine must be synchronized (phased) in order to determine and optimize the best time to burn the fuel in the cylinder for the optimization of emissions, consumption, etc.

Synchronization or phasing of the engine is generally achieved by combining information from a crankshaft position sensor and a camshaft position sensor which detect targets such as teeth on toothed wheels.

To do this, a crankshaft conventionally comprises a toothed wheel, or crankshaft target, which typically comprises a set of teeth regularly distributed along its circumference (for example from 36 to 120 teeth), and whose teeth are detected by a sensor called CRK sensor. The toothed wheel secured to the crankshaft comprises a reference portion devoid of teeth in the form of a recess or a long tooth, also called GAP, the term used below. By detecting the passage of the teeth in front of the sensor and counting the number of teeth from the GAP during engine rotation, it is possible to know the position of the crankshaft over a 360° crankshaft revolution, in other words 360°CRK, the angle of rotation of the crankshaft being expressed in °CRK.

The crankshaft target provided with teeth, thus presents an asymmetry, also called signature, produced by the marker which makes it possible to know the engine position to within 360°CRK. However, an engine cycle (for an engine called a 4-stroke engine) takes place over two complete rotations of the crankshaft and knowledge of the angular position of the crankshaft is therefore insufficient to determine the position of the engine with respect to one engine cycle.

It is then known to combine the information obtained from the rotation of the crankshaft with angular position information corresponding to a camshaft, which is rotated by the crankshaft with a reduction ratio of 2 so that the camshaft completes one full rotation when the crankshaft completes two. Thus, the additional camshaft information makes it possible to determine a correct phasing, that is to say makes it possible to know with certainty where each cylinder is placed in the combustion cycle, and which also comprises a toothed wheel whose teeth are detected by a corresponding sensor. With the angle of rotation of the camshaft being expressed in °CAM, it is thus noted that one revolution of 360°CAM is equivalent to 720°CRK. By then positioning a toothed wheel on the camshaft which for its part also has a rotational asymmetry, the corresponding information, crossed with the information on the position of the crankshaft, makes it possible to deduce with precision the state of the engine cycle.

The succession of signals received by the camshaft sensor, called CAM, is generally not regular but follows a known profile which allows more precise knowledge of the position of the cylinders in the engine.

A known synchronization method consists, at each GAP, in comparing the information received by the camshaft sensor with theoretical information stored in the computer. If this information is similar, the GAP is recognized and the engine position as well.

Thus, during each engine start, the engine is synchronized when the crankshaft GAP combined with the detection of the state of the camshaft wheel is detected.

In order to reduce the fuel consumption as well as the polluting emissions of an engine, the technology of engines with variable valve timing (VVT) according to which the angular position of the intake camshaft and/or of the exhaust camshaft is varied to cause recirculation of the exhaust gases in the cylinders is increasingly used.

For such engines, it is known to use a target of the cogwheel type mounted at the end of the camshaft (called CAM target) which comprises an arrangement of teeth making it possible to know (with the information coming from the position of the crankshaft) the position of each of the pistons in the corresponding cylinders.

Two technologies are mainly used to produce CAM sensors intended to be associated with CAM targets, namely:

1.: "True Power On" TPO sensors (that is to say whose signal can be interpreted as soon as the initialization phase of the sensor is completed) which are sensors suitable for detecting high or low levels corresponding respectively to recesses and teeth on the toothed wheel. These sensors have an average precision in the detection of a passage between a recess and a tooth or a passage between a tooth and a recess but allow a faster synchronization of the engine because they can be used with targets provided with teeth of different lengths (the distance between a rising edge and a falling edge of a tooth is called length) and make it possible to recognize these teeth, which allows an average synchronization distance of 230°CRK.

2.: differential sensors. These sensors are not always able to read the first level of the teeth or recesses of a CAM target. In order to reduce this inconvenience when starting, the teeth facing one another on the target are designed to be as small as possible and all equivalent. These sensors have greater temporal precision (detection on edge) but have a lower average synchronization speed than TPO sensors with the current target designs on average 280°CRK because only the number and position of the teeth can be recognized, and not the information relating to the size of the teeth.

Document US-2014/0360254 relates to a toothed wheel for a camshaft having a plurality of teeth irregularly spaced from one another but with an edge at 0°, 90°, 120°, 180°, 240° and 270°CAM.

Document U.S. Pat. No. 6,474,278 relates to a control device for an internal combustion engine which for its part also comprises a toothed wheel associated with a camshaft. Here the toothed wheel illustrated in FIG. 3 has nine teeth.

In a known manner, a variable timing system for an internal combustion engine comprises at least one actuator for modifying the position of at least one camshaft. A "conventional" system uses a hydraulic actuator and a control of the position of the camshaft every 180°CRK is sufficient.

However, more and more often, electric actuators are used, in particular for a camshaft controlling the intake valves. With such actuators, more precise control of the camshaft position is required because the camshaft oscillates more quickly toward its setpoint position. This control then requires a greater number of regularly spaced edges in order to make it possible to trigger tasks at predetermined engine positions. With a VVT system with an electric actuator, there should be provision to have a signal every 90°CRK.

In conclusion, a VVT system using an electric actuator requires having a greater number of teeth on the target of the corresponding camshaft (generally at the intake).

The problem which then arises is to achieve the synchronization mentioned above. This synchronization is based on an asymmetry in the distribution of the teeth at the periphery of the target. In addition, the space available for the target is limited. In addition, a sensor, in particular a TPO sensor, requires, on the one hand, a sufficient difference in level between a recess and a tooth in order to distinguish the passage from a tooth to a recess and vice versa, and, on the other hand, a minimum peripheral length of teeth and recesses to detect a tooth or a recess. Finally, a TPO-type sensor well knows how to recognize the high levels corresponding to a tooth and the low levels corresponding to a recess but is generally more precise in recognizing a falling edge than a rising edge. Provision is therefore generally made to interpret only the falling edges with such a sensor.

It is known to have a target with nine teeth as in the prior art presented above.

An alternative solution is to provide two separate targets, but this solution requires the use of two sensors (and two targets). This solution is expensive and is therefore not preferred.

The object of the present invention is therefore to provide, for an engine with variable timing using an electric actuator and a TPO-type sensor, a target of reduced size and allowing good synchronization to be achieved.

SUMMARY OF THE INVENTION

The present disclosure will improve the situation.

There is proposed here a camshaft toothed wheel, forming a target for a camshaft position sensor, comprising a circular body provided with two opposite main faces and being provided on its circumference with a series of teeth.

This camshaft toothed wheel is such that said series of teeth comprises eight teeth, each tooth having, for a given first direction of rotation of the wheel, a rising edge and a falling edge and two neighboring teeth being separated by a recessed part, such that the edges of a first type, rising or falling, are evenly distributed at the periphery of the toothed wheel, such that the angular length of the recessed parts is greater than or equal to arctan(Llow/R)°CAM, where R is the radius expressed in mm of the wheel with the teeth and Llow is the minimum distance between the edges of two consecutive teeth delimiting an interval allowing detection of the low level between these edges by the sensor, except for one recessed part, and such that the angular length of a tooth is greater than or equal to arctan(Lhigh/R)°CAM, except for one tooth, Lhigh being the minimum distance between the edges of a tooth allowing detection of the high level between the two edges by the sensor.

A target is thus produced which comprises, on the one hand, a tooth which is not visible by a PTO-type sensor at the start (first revolution) of an initialization of this sensor and, on the other hand, a recessed part which is not seen by this sensor. Thus, at the start of initialization, the sensor not seeing the tooth identifies a long recessed part and likewise it identifies a long tooth in place of the two teeth separated by a recessed part. An asymmetry is thus created in the target which can be exploited for engine synchronization.

The angular values of the teeth and of the recessed parts are chosen to be seen or not to be seen by a TPO-type sensor during the first rotation of the target in front of the sensor. The sensor is located opposite the target, as close as possible to it, taking care to maintain a space (air gap) between the teeth and the sensor. The sensor "sees" whether the periphery of the target, at a distance R from the center of the target, is full (presence of a tooth) or empty (presence of a recess). The length of a tooth as well as that of a recess is then measured at the outer diameter (2*R) of the target.

According to an advantageous embodiment of this camshaft toothed wheel, the edge of a first type associated with the recessed part of angular length less than arctan(Llow/R)°CAM and the edge of a first type associated with the tooth of angular length less than arctan(Lhigh/R)°CAM are for example diametrically opposed. Two particular features are thus produced on the target which are offset by substantially 180°CAM, that is to say 360°CRK, and these particular features can be made to coincide with a gap of a crankshaft target.

A preferred embodiment provides that six teeth have the same angular length, preferably between arctan(Lhigh/R) and arctan(Lhigh*1.3/R)°CAM. Two particular features are thus produced on the target which are offset by substantially 180°CAM, that is to say 360°CRK, and these particular features can be made to coincide with a gap of a crankshaft target.

To promote the detection of the edges of a first type by a TPO-type sensor, the edges of a first type are the falling edges.

The present disclosure also relates to an engine control system comprising a computer, a crankshaft toothed wheel and a crankshaft sensor, a camshaft toothed wheel as described and a TPO-type camshaft sensor. A TPO-type sensor is a sensor that provides a "true" signal, that is to say an interpretable signal, as soon as it is switched on (hence "true power on").

Provision is then made for the crankshaft toothed wheel and the camshaft toothed wheel to be angularly set so that the crankshaft toothed wheel has a marker (GAP) set either in the space between the recessed part of angular length less than arctan (Llow/R)°CAM and the next first-type edge, or in the space between the tooth of angular length less than arctan(Lhigh/R)°CAM and the next first-type edge, and for which the computer comprises an engine synchronization algorithm adapted to recognize the sequences formed by the teeth and recessed parts of the camshaft toothed wheel and to deduce the engine position therefrom in real time.

In such an engine control system, the crankshaft toothed wheel may for example have a marker (GAP) set both in the space between the recessed part of angular length less than arctan(Llow/R)°CAM and the next first-type edge, and in the space between the tooth of angular length less than arctan(Lhigh/R)°CAM and the next first-type edge.

For an engine comprising a double camshaft, an engine control system described above then advantageously comprises two camshaft toothed wheels as described above, said toothed wheels being similar.

The present disclosure also proposes a method of synchronization between a signal supplied by the crankshaft sensor of a system as described above and a signal supplied by a TPO-type camshaft sensor of a system as described above, the signal from the camshaft sensor being compared with a stored signal model corresponding to a target shape. According to this method, when the engine is started, during the first revolution of the camshaft toothed wheel, the camshaft sensor operates with a first sensitivity that does not allow it to detect the presence of the recessed part of angular length less than arctan(Llow/R)°CAM nor the tooth of angular length less than arctan(Lhigh/R)°CAM and the signal obtained is compared with a first stored signal model corresponding to a target with six teeth including one tooth longer than the others and with six recessed parts including one recessed part longer than the others, and during the following revolutions, the camshaft sensor operates with a second sensitivity that is greater and more precise than the first sensitivity allowing it to detect the presence of the recessed part of angular length less than arctan(Llow/R)°CAM as well as the tooth of angular length less than arctan(Lhigh/R)°CAM, the signal then being compared with a second stored signal model corresponding to a target with eight teeth with falling edges evenly distributed at the periphery of the target.

With this synchronization method, during the first rotation of the camshaft target, the too short teeth and the too short recesses are not seen because the magnetic field varies less than the predefined thresholds in the sensor for the detections of edges. Thus a disadvantage of a TPO sensor is here used as an advantage.

Finally, the present disclosure also relates to an engine with variable valve timing, characterized in that it comprises an engine control system described above.

According to a particular embodiment, a TPO-type sensor can recognize the presence of a tooth if the length of the latter on the periphery of the target is at least Lhigh which, for currently known sensors, has a value of approximately 3 mm. The detection of a recessed part by a TPO sensor requires a length of this part called Llow which is greater than Lhigh. The value of Llow is of the order of 9 mm for current TPO sensors. Thus, in the definition of the target proposed above, there can then be provision to have at least one tooth with a length of less than 2.5 mm (measured at the outer periphery of the target) to be sure of not detecting it and to have a recessed part with a length of less than 8 mm (measured at the outer periphery of the target) to be sure not to detect it as well.

A camshaft toothed wheel is then proposed, forming a target for a camshaft position sensor, comprising a circular body provided with two opposite main faces and being provided on its circumference with a series of teeth.

In this embodiment, said series of teeth comprises eight teeth, each tooth having, for a given first direction of rotation of the wheel, a rising edge and a falling edge and two neighboring teeth being separated by a recessed part; the edges of a first type, rising or falling, are evenly distributed at the periphery of the toothed wheel; the angular length of the recessed parts is greater than or equal to arctan(8/R)°CAM, where R is the radius expressed in mm of the wheel with the teeth, except for one recessed part, and the angular length of a tooth is greater than or equal to arctan(2.5/R)°CAM, except for one tooth.

According to an advantageous embodiment of this camshaft toothed wheel, the edge of a first type associated with the recessed part of angular length less than arctan(8/R)°CAM and the edge of a first type associated with the tooth of angular length less than arctan(2.5/R)°CAM are for example diametrically opposed.

For this embodiment, provision can also be made for six teeth to have the same angular length, preferably between arctan(2.5/R) and arctan(4/R)°CAM.

To promote the detection of the edges of a first type by a TPO-type sensor, the edges of a first type are the falling edges.

The present disclosure also relates to another engine control system comprising a computer, a crankshaft toothed wheel and a crankshaft sensor, a camshaft toothed wheel as described above and a TPO-type camshaft sensor. According to this variant embodiment, provision is made for the crankshaft toothed wheel and the camshaft toothed wheel to be angularly set so that the crankshaft toothed wheel has a marker (GAP) set either in the space between the recessed part of angular length less than arctan(8/R)°CAM and the next first-type edge, or in the space between the tooth of angular length less than arctan(2.5/R)°CAM and the next first-type edge, and for which the computer comprises an engine synchronization algorithm adapted to recognize the sequences formed by the teeth and recessed parts of the camshaft toothed wheel and to deduce the engine position therefrom in real time.

In such an engine control system, the crankshaft toothed wheel may for example have a marker (GAP) set both in the space between the recessed part of angular length less than arctan(8/R)°CAM and the next first-type edge, and in the space between the tooth of angular length less than arctan(2.5/R)°CAM and the next first-type edge.

For an engine comprising a double camshaft, an engine control system described above then advantageously comprises two camshaft toothed wheels as described above, said toothed wheels being similar.

The present disclosure also proposes a method of synchronization between a signal supplied by the crankshaft sensor of an engine control system as described above and a signal supplied by a TPO-type camshaft sensor of an engine control system as described above, the signal from the camshaft sensor being compared with a stored signal model corresponding to a target shape. According to this method, when the engine is started, during the first revolution of the camshaft toothed wheel, the camshaft sensor operates with a first sensitivity that does not allow it to detect the presence of the recessed part of angular length less than arctan(8/R)°CAM nor the tooth of angular length less than arctan(2.5/R)°CAM and the signal obtained is compared with a first stored signal model corresponding to a target with six teeth including one tooth longer than the others and with six recessed parts including one recessed part longer than the others, and during the following revolutions, the camshaft sensor operates with a second sensitivity which is more precise than the first sensitivity allowing it to detect the presence of the recessed part of angular length less than arctan(8/R)°CAM as well as the tooth of angular length less than arctan(2.5/R)°CAM, the signal then being compared with a second stored signal model corresponding to a target with eight teeth with falling edges evenly distributed at the periphery of the target.

Finally, the present disclosure also relates to an engine with variable valve timing, and an engine control system described above.

According to another aspect, a computer program is proposed comprising instructions for implementing all or part of a synchronization method as defined above when this program is executed by a processor. According to another aspect, there is proposed a computer-readable nonvolatile storage medium on which such a program is stored.

BRIEF DESCRIPTION OF THE DRAWINGS

Other features, details and advantages will become apparent from reading the following detailed description and from examining the appended drawings, in which.

DESCRIPTION OF THE PREFERRED EMBODIMENTS

The drawings and description below essentially contain elements of certain nature. They may therefore be used not only to better understand the present disclosure, but also for contributing to the definition thereof, where applicable.

In the following description, both angles measured at the level of a camshaft and called degrees CAM or °CAM and angles measured at the level of a crankshaft and called degrees CRK or °CRK are used. We have the equality 1°CAM=2°CRK since the rotational speed of a camshaft is half the rotational speed of a crankshaft on all four-stroke internal combustion engines.

Figure 1:
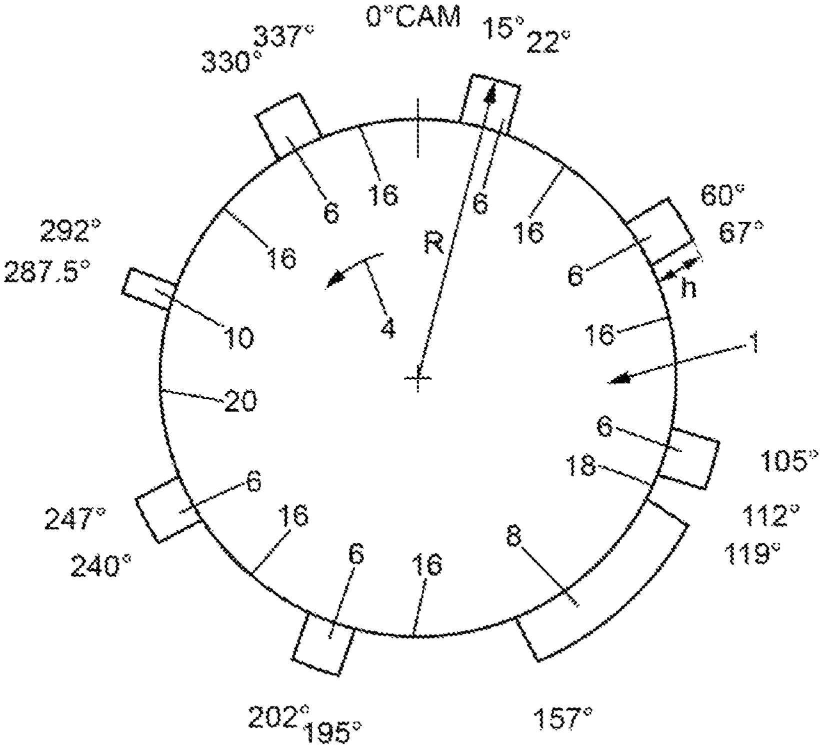
FIG. 1 schematically shows a camshaft toothed wheel according to the invention and an embodiment thereof.

The description which follows relates more particularly to a camshaft toothed wheel 1 and such a wheel is shown schematically in FIG. 1.

The toothed wheel 1 of FIG. 1 has eight teeth. Despite its relatively large number of teeth, it is intended to cooperate with a TPO-type sensor and can moreover be of a relatively small diameter, small enough to also be able to be used on engines intended to equip motorcycles.

This toothed wheel 1 is thus intended to form a target for a camshaft position sensor of the TPO (True Power On) type. This wheel is formed from a circular disk comprising two substantially parallel opposite main faces. The disk has for example an outer radius R, for example (purely by way of nonlimiting illustration) of 20 or 25 mm. Its peripheral surface is then machined to form teeth, a recessed part each time separating two neighboring teeth. Each tooth has flanks, called edges, which each correspond to a face which can be machined of the corresponding tooth and which extends substantially radially with respect to the circular disk. Each tooth also has a top face which corresponds to the initial shape of the disk, that is to say here a circular cylindrical surface zone of radius R. The recessed parts also appear as a circular cylindrical surface zone (with possibly a rounded connection toward the flanks of the teeth). The radius of curvature of these recessed parts corresponds to the radius R of the base disk reduced by a height h, also called tooth height. It is assumed here that all the teeth of the toothed wheel have the same height.

The design of the toothed wheel 1 presented in FIG. 1 corresponds to a camshaft target capable of cooperating with a TPO-type sensor making it possible to detect low levels (corresponding to a recessed part) and high levels (corresponding to a tooth). It makes it possible to ensure synchronization with a "conventional" signal supplied by a sensor associated with a crankshaft toothed wheel (for example a toothed wheel with 60 teeth minus two forming a GAP) and to give a signal every 90°CRK to precisely control variable valve timing (VVT).

The use of this type of sensor imposes having, on the one hand, a sufficiently large space between the teeth to be able to detect a first edge after initialization of the sensor.

Specifically, depending on the air gap distance between the target (here the toothed wheel 1) and the sensor, the magnetic field detected by the sensor may vary too weakly to be able to detect the first recessed part.

Conventionally, a tooth must have a minimum length Lhigh (which is generally of the order of 3 mm measured on the periphery of the target) to be correctly detected from the first revolution during an initialization of the sensor, while a recessed part must for its part have a minimum length Llow which is generally of the order of 9 mm. The measurement of this last length is done for example at the level of the periphery of the target.

To be detected by a TPO-type sensor from the first revolution of the target, it is therefore necessary to have a minimum theoretical length of:

arctan(Lhigh/R) for a tooth, and arctan(Llow/R) for a recessed part.

With the result being an angle measured directly on the toothed wheel, it is therefore °CAM.

By way of nonlimiting numerical examples, for a target of radius R=25 mm:

- a recessed part must then have an angular length of 19.8°CAM=arctan(9/25)
- a tooth must then have an angular length of 6.84°CAM=arctan(3/25).

For a target with a radius of 20 mm:

- a recessed part must have an angular length of arctan(9/20)°CAM, i.e. 24.23°CAM=48.46°CRK.
- a tooth must have an angular length of arctan (3/20)°CAM, i.e. 8.53°CAM=17.06°CRK.

The original proposal made here is to provide, on the one hand, a recessed part having an angular length less than arctan(8/R) and a tooth with an angular length less than arctan(2.5/R) to ensure that this recessed part and this tooth will not be detected after the initialization of the sensor. The values 8 and 2.5 are chosen to be slightly less than 9 and 3, that is to say Llow and Lhigh respectively, as a margin to make the system more robust.

Thus, if a recessed part is not detected during the first rotation of the camshaft target, the signal from the sensor at this zone corresponds substantially to that of a tooth of great length. Similarly, if the tooth of short length is not detected during this first rotation, the signal from the sensor at this zone then corresponds to that of a large recessed part.

There is thus in FIG. 1 a toothed wheel 1 forming a camshaft target intended to cooperate with a TPO-type sensor with:

- six "normal" teeth 6 intended to be seen by the TPO sensor during initialization. These teeth 6 each have an angular length greater than arctan(Lhigh/R). Thus, for example, for R=25 mm (we then have arctan (Lhigh/R)=arctan(3/25)=6.84°CAM), we choose, for example, as illustrated in FIG. 1, an angular tooth length of 7°CAM, that is to say 14°CRK;

- a long tooth 8 with an angular length of 38°CAM (i.e. 76°CRK);
- a short tooth 10 with an angular length of 4.5°CAM (i.e. 9°CRK);
- six "normal" recessed parts 16 with an angular length of 38°CAM. Such a recessed part 16 forms with a "normal" tooth 6 a zone with an angular length of 45°CAM, that is to say one-eighth of a revolution;
- a short recessed part 18 with an angular length of 7°CAM. This short recessed part 18 forms with the long tooth 8 a zone with an angular length of 45°CAM, that is to say one-eighth of a revolution; and
- a long recessed part 20 with an angular length of 41.5°CAM. This long recessed part 20 forms with the short tooth 10 a zone with an angular length of 45°CAM, that is to say one-eighth of a revolution.

The teeth are arranged as follows: if we consider that the TPO sensor identifies the falling edges with greater precision, that is to say that it better identifies the passage from a tooth to a recessed part, all the falling edges of the teeth are evenly distributed at the periphery of the target and are therefore offset from one another by 45°CAM (i.e. 90°CRK).

In summary, the position of the edges (alternation of rising and falling edges, the first edge being rising) is for example the following (in °CRK):

30; 30+B; 120; 120+B; 210; 210+B; 210+B+E; 300+B; 390; 390+B; 480; 480+B; 570+B-D; 570+B; 660; 660+B.

These values are chosen so that the falling edges (x+B) are equidistant from 90°CRK.

In the example illustrated, B is chosen as being the smallest possible but large enough to allow detection during an initialization, that is to say greater than arctan(Lhigh/R), i.e. for R=25 and Lhigh=3, B>arctan(3/25) (°CAM) or even B>13.69°CRK.

D corresponds to the angular length of the short tooth 10. It is chosen to be less than arctan(Lhigh/R). For Lhigh=3, D will for example preferably be chosen to be less than arctan(2.5/R), that is to say for R=25 mm less than 13.69°CRK, preferably less than 11.42°CRK. Here, in the example given for R=25 mm, we took D=9°CRK.

Finally, E which corresponds to the angular length of the short recessed part 18 is chosen to be less than arctan(Llow/R). For Llow=9 mm, E is preferably taken to be even less than arctan(8/R), that is to say for R=25 mm less than 39.61°CRK, preferably less than 35.49°CRK. Here, in the example given for R=25 mm, we took E=17°CRK.

In the direction of rotation illustrated in FIG. 1 by the arrow 4, there is a succession of recessed parts and teeth such that the angular length of a recessed part and of the tooth which follows is 45°CAM. In addition, the 45°CAM zone formed by the short recessed part 18 and the long tooth 8 is diametrically opposed to the 45°CAM zone (comprising a "normal" recessed part 16 and a "normal" tooth 6) following the long recessed part 20 and the short tooth 10.

This is of course a preferred embodiment with numerical values given by way of nonlimiting illustration.

Figure 2:
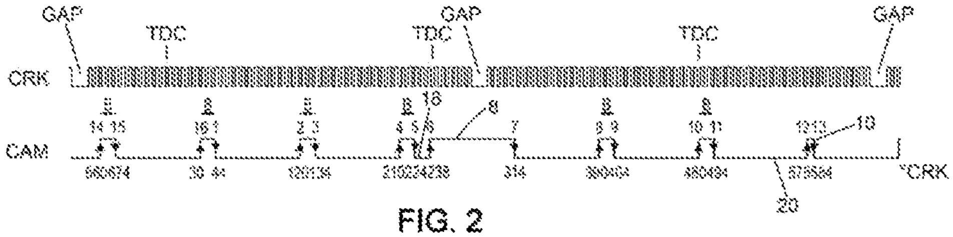
FIG. 2 schematically shows an example of the relative position of the edges of the toothed wheel of FIG. 1 with the edges of a crankshaft wheel.

In FIG. 2, the periphery of the target (toothed wheel 1) is developed flat and presented in the form of a (filtered) signal which could come from a sensor arranged facing the target.

This target periphery, or signal, is placed in parallel with a similar diagram corresponding to a crankshaft target. As already mentioned, a crankshaft makes two revolutions while a camshaft makes only one. There is therefore at the top of FIG. 2 a representation over 720°CRK for a representation at the bottom over 360°CAM.

At the top of FIG. 2, we recognize first of all crenellations corresponding to teeth (there are 58 teeth here) and a GAP corresponding to two teeth. We have also represented the position of the top dead centers TDC (for a 3-cylinder engine, that is to say at 0°, 240° and 480°CRK.

In FIG. 2, synchronization is provided between the crankshaft and the camshaft so that the GAP is situated either after the short recessed part 18 and before the falling edge which follows, or after the short tooth 10 and before the falling edge which follows.

In this FIG. 2, there is thus a schematic representation of a crankshaft sensor signal (at the top) and of a camshaft sensor (at the bottom) after initialization of the camshaft sensor.

Figure 3:
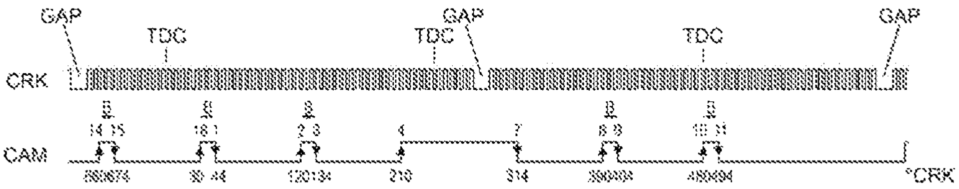
FIG. 3 is a view corresponding to FIG. 2 showing the edges seen by a sensor associated with the toothed wheel of FIG. 1 in the initialization phase.

FIG. 3 is a diagram corresponding to FIG. 2: the top line corresponding to the crankshaft is similar to that of FIG. 2. On the other hand, the bottom line illustrates what a TPO sensor associated with the target of FIG. 1 sees during the initialization of this sensor, on the first revolution of the corresponding camshaft after starting the engine. FIG. 2 shows what the TPO sensor sees during the following revolutions of the camshaft.

As mentioned above, the short tooth 10 and the short recessed part 18 have been designed so that they are not detected by the camshaft sensor. Thus the sensor "sees" a single "very" long tooth instead of a "normal" tooth 6 and the long tooth 8 and a single "very" long recessed part instead of a "normal" recessed part 16 and the long recessed part 20. The synchronization is such that each GAP at the crankshaft comes to coincide with this "very" long tooth and this "very" long recessed part. This asymmetrical signal thus makes it possible to achieve synchronization.

Figure 4:
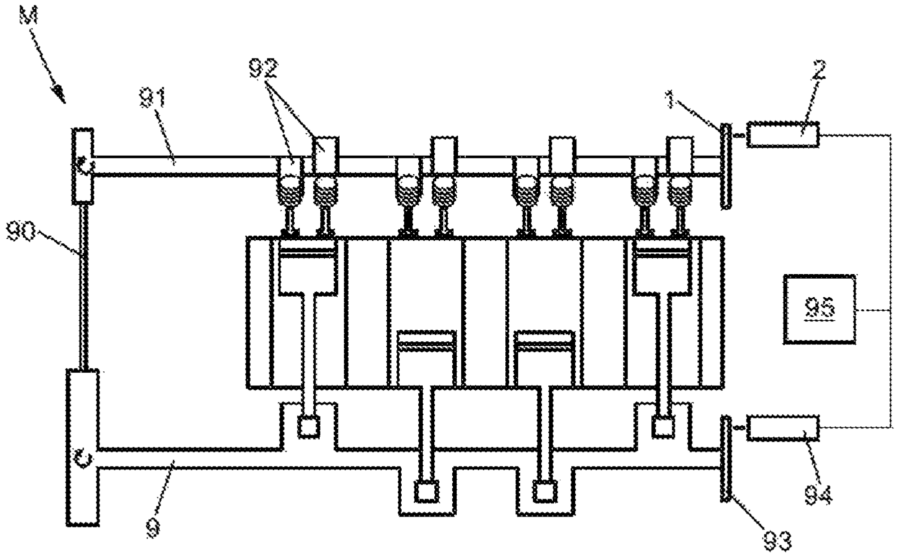
FIG. 4 shows an engine incorporating an engine control system using a toothed wheel such as that illustrated for example in FIG. 1.

With reference to FIG. 4, there is shown schematically an example of an internal combustion engine with variable timing comprising a toothed wheel according to the preceding description.

The engine M comprises a crankshaft 9, driving in rotation by a timing belt 90 at least one camshaft 91, the rotation of which successively causes the opening and closing of intake and exhaust valves by cams 92. Since the engine has variable timing, it may also comprise means (not shown) for angularly offsetting the camshaft to modify the opening times of the valves with respect to an identical position of the crankshaft. The maximum offsetting angle is generally of the order of 25°CAM (i.e. 50°CRK).

The engine may comprise an intake camshaft 91, controlling the opening and closing of the intake valves, and an exhaust camshaft 91, controlling the opening and closing of the exhaust valves. In the view of FIG. 4, these two camshafts 91 coincide, one hiding the other which has the same shape.

The crankshaft 9 comprises a toothed wheel 93 comprising a set of teeth evenly distributed at its circumference, typically 36 or 60 teeth, with the exception of one or two GAP zones, typically with one or two missing teeth. The example taken from FIGS. 2 and 3 corresponds to 60 teeth with two GAP zones of two missing teeth each.

A sensor 94 of the angular position of the crankshaft 9 is positioned facing a toothed wheel 93 associated with the crankshaft 9 and is adapted to detect the passage of each tooth of the toothed wheel 93.

On the camshaft 91 or on each camshaft is mounted a toothed wheel 1. A sensor 2 is positioned in front of each toothed wheel 1 and is adapted to detect the passage of each tooth of the corresponding toothed wheel 1, by detecting the rising edge or the falling edge, in the case described above, the falling edge. In the case where the engine comprises two camshafts, which is most common for a variable valve timing engine, the toothed wheels of the camshafts can either be similar or different. It is possible to use one type of toothed wheel on one camshaft and another type on the other camshaft. Likewise, the sensors 2 can be similar or different. It is assumed here that at least one camshaft 91 is equipped with a toothed wheel 1 as described above (or with similar characteristics). Preferably, this toothed wheel 1 is mounted on the camshaft 91 cooperating with the intake valves of the engine M and moreover, still preferably, the associated sensor 2 is of the TPO type. The preferred embodiment is that where the two camshaft targets are similar and the two associated sensors are also similar.

The engine M also comprises a central processing unit 95 adapted to receive the detection signals from the angular position sensors of the crankshaft and of the camshaft, and to deduce therefrom a state of the engine cycle at each instant.

The central processing unit 95 particularly manages the synchronization of the engine. To achieve this synchronization, the variable valve timing system is deactivated and the camshafts 91 remain in a predetermined position, or neutral position. When the engine is started, each camshaft 91 makes a first revolution. The sensor 2 associated with the camshaft 91 (or each camshaft) provided with a toothed wheel 1 similar to that illustrated in FIG. 1 operates with a first sensitivity which does not allow it to distinguish, on the one hand, the short tooth 10 and, on the other hand, the short recessed part 18. Thus, during this first revolution, the sensor 2 considered sees the passage of five similar teeth and one longer tooth, just as it sees the passage of five similar recessed parts and one longer recessed part. To recognize this signal supplied by the sensor 2, the central processing unit 95 compares it with a first signal model corresponding to the signal supposed to be supplied by a target with five similar teeth and one longer tooth. Thus the signal supplied by the sensor 2 is recognized by the central processing unit 95 and synchronization with the signal received by the sensor 94 of the angular position of the crankshaft 9. The longer tooth is detected simultaneously with the passage of a first GAP of the toothed wheel 93 associated with the crankshaft 9 while the longer recessed part is detected simultaneously with the passage of a second GAP of the toothed wheel 93. In this way, it is possible to distinguish the passage of the first GAP from the passage of the second GAP and thus to know precisely the position of the engine over 720°CRK.

During the second revolution of the camshaft, the sensitivity of the sensor 2 associated with the camshaft 91 provided with a toothed wheel 1 similar to that illustrated in FIG. 1 is increased so that the associated sensor 2 identifies the passage, on the one hand, of the short tooth 10 and, on the other hand, of the short recessed part 18. Thus, subsequently, the eight falling edges of the toothed wheel 1 are identified at each rotation of the corresponding camshaft 91 and the variable valve timing (VVT) benefits from a signal every 90°CRK for its control. For this second revolution and the following ones, the signal from the sensor 2 is compared in the central processing unit 95 with a second signal model with a falling edge every 90°CRK. In an original manner, two models of signals (or targets) are stored in the central processing unit 95.

INDUSTRIAL APPLICATION

The technical solution described above takes advantage of a drawback of TPO-type sensors to propose a toothed wheel design which is both compact and which makes it possible to supply a signal every 90°CRK.

During a first passage, depending on the air gap distance between the sensor and the target, the magnetic field detected by the sensor varies too weakly to be able to detect all the edges. Internal learning in the sensor 2 is carried out to allow correct detection from the second revolution of the camshaft (and its associated target). This characteristic of TPO-type sensors is generally considered to be a weakness because it requires taking the margin in the dimensioning of the targets in order to be able to detect the passage of the teeth, in particular the first tooth, with certainty. Poor detection generally generates a failure in the synchronization method because the succession of detected edges does not correspond to the stored model and which should have been detected. Until now, it was considered that the use of a TPO sensor allowed quick synchronization because it allows a detection of the levels but did not make it possible to carry out quick control of a variable valve timing. Here, in an original manner, a first stored model is used for the first revolution of the target and a second stored model is used subsequently.

The proposed solution also has good synchronization performance because different tooth levels are arranged facing the GAP markers on the crankshaft. Thus synchronization can be performed on average over 230°CRK thanks also to the use of two distinct models for synchronization. The use of a target which would comprise eight teeth distributed at the periphery of the target and a ninth tooth to create an asymmetry in the profile of the target would lead a priori to an average value of the order of 360°CRK to achieve synchronization of the engine.

The proposed solution can be proposed both on a camshaft controlling the intake valves and the exhaust valves. It is possible in the same engine to have two similar targets on the camshafts and two sensors associated with said targets which are similar as well. Thus the number of separate parts in the engine is limited, which is favorable because it makes it possible to reduce costs without compromising in terms of quality.

The present disclosure is not limited to the exemplary embodiments described and mentioned above, solely by way of examples, but it encompasses all the variants that those skilled in the art may consider in the context of the protection sought.

The invention claimed is:

1. A camshaft toothed wheel for a camshaft position sensor, the camshaft toothed wheel comprising:

a circular body including two axial end faces and an outer periphery; and a series of teeth arranged along the outer periphery, the series of teeth comprising eight teeth separated from each other via a respective recessed part, each tooth including a rising edge and a falling edge with respect to a direction of rotation of the camshaft toothed wheel, wherein the rising edge of each tooth or the falling edge of each tooth is a first edge, each first edge being evenly distributed about the outer periphery, wherein an angular length of only a first recessed part of the respective recessed parts is less than arctan(Llow/R)°CAM, in which R is a maximum radius of the camshaft toothed wheel including the series of teeth expressed in mm, and Llow is a minimum distance between the falling edge and the rising edge of adjacent teeth required for detection of the respective recessed part via the camshaft position sensor, and wherein an angular length of only a first tooth of the series of teeth is less than arctan(Lhigh/R)°CAM, in which Lhigh is a minimum distance between the rising edge and the falling edge of a single tooth required for detection of the single tooth via the camshaft position sensor.

2. The camshaft toothed wheel as claimed in claim 1, wherein the first edge associated with the first recessed part and the first edge of the first tooth are diametrically opposed.

3. The camshaft toothed wheel as claimed in claim 2, wherein six teeth of the series of teeth have an equal angular length.

4. The camshaft toothed wheel as claimed in claim 2, wherein the falling edge of each tooth is the first edge.

5. The camshaft toothed wheel as claimed in claim 2, wherein Llow is 8 mm, and wherein Lhigh is 2.5 mm.

6. An engine control system comprising:

a computer;

a crankshaft sensor associated with a crankshaft toothed wheel; and a “True Power On” (TPO)-type camshaft sensor associated with the camshaft toothed wheel as claimed in claim 2, wherein the crankshaft toothed wheel and the camshaft toothed wheel are angularly set such that a marker (GAP) of the crankshaft toothed wheel is arranged at a first position corresponding to a space between the first recessed part and a next first edge of the camshaft toothed wheel, and/or at a second position corresponding to a space between the first tooth and a next first edge of the camshaft toothed wheel, and wherein the computer comprises an engine synchronization algorithm adapted to recognize sequences formed by the series of teeth and the respective recessed parts of the camshaft toothed wheel, and to compare the sequences to the marker (GAP) of the crankshaft toothed wheel so as to determine an engine position in real time.

7. The camshaft toothed wheel as claimed in claim 1, wherein six teeth of the series of teeth have an equal angular length.

8. The camshaft toothed wheel of claim 3, wherein an angular length of each of the six teeth is in a range of arctan(Lhigh/R)°CAM to arctan(Lhigh*1.3/R)°CAM.

9. The camshaft toothed wheel as claimed in claim 7, wherein the falling edge of each tooth is the first edge.

10. The camshaft toothed wheel as claimed in claim 7, wherein Llow is 8 mm, and wherein Lhigh is 2.5 mm.

11. An engine control system comprising:

a computer;

a crankshaft sensor associated with a crankshaft toothed wheel; and a “True Power On” (TPO)-type camshaft sensor associated with the camshaft toothed wheel as claimed in claim 7, wherein the crankshaft toothed wheel and the camshaft toothed wheel are angularly set such that a marker (GAP) of the crankshaft toothed wheel is arranged at a first position corresponding to a space between the first recessed part and a next first edge of the camshaft toothed wheel, and/or at a second position corresponding to a space between the first tooth and a next first edge of the camshaft toothed wheel, and wherein the computer comprises an engine synchronization algorithm adapted to recognize sequences formed by the series of teeth and the respective recessed parts of the camshaft toothed wheel, and to compare the sequences to the marker (GAP) of the crankshaft toothed wheel so as to determine an engine position in real time.

12. The camshaft toothed wheel as claimed in claim 1, wherein the falling edge of each tooth is the first edge.

13. The camshaft toothed wheel as claimed in claim 12, wherein Llow is 8 mm, and wherein Lhigh is 2.5 mm.

14. An engine control system comprising:

a computer;

a crankshaft sensor associated with a crankshaft toothed wheel; and a “True Power On” (TPO)-type camshaft sensor associated with the camshaft toothed wheel as claimed in claim 12, wherein the crankshaft toothed wheel and the camshaft toothed wheel are angularly set such that a marker (GAP) of the crankshaft toothed wheel is arranged at a first position corresponding to a space between the first recessed part and a next first edge of the camshaft toothed wheel, and/or at a second position corresponding to a space between the first tooth and a next first edge of the camshaft toothed wheel, and wherein the computer comprises an engine synchronization algorithm adapted to recognize sequences formed by the series of teeth and the respective recessed parts of the camshaft toothed wheel, and to compare the sequences to the marker (GAP) of the crankshaft toothed wheel so as to determine an engine position in real time.

15. The camshaft toothed wheel as claimed in claim 1, wherein Llow is 8 mm, and wherein Lhigh is 2.5 mm.

16. An engine control system comprising:

a computer;

a crankshaft sensor associated with a crankshaft toothed wheel; and a “True Power On” (TPO)-type camshaft sensor associated with the camshaft toothed wheel as claimed in claim 1, wherein the crankshaft toothed wheel and the camshaft toothed wheel are angularly set such that a marker (GAP) of the crankshaft toothed wheel is arranged at a first position corresponding to a space between the first recessed part and a next first edge of the camshaft toothed wheel, and/or at a second position corresponding to a space between the first tooth and a next first edge of the camshaft toothed wheel, and wherein the computer comprises an engine synchronization algorithm adapted to recognize sequences formed by the series of teeth and the respective recessed parts of the camshaft toothed wheel, and to compare the sequences to the marker (GAP) of the crankshaft toothed wheel so as to determine an engine position in real time.

17. The engine control system as claimed in claim 16, wherein the marker (GAP) is arranged at the first position and at the second position.

18. An engine with variable valve timing, the engine comprising the engine control system as claimed in claim 16.

19. An engine control system comprising:

a computer;

a crankshaft sensor associated with a crankshaft toothed wheel; and two "True Power On" (TPO)-type camshaft sensors respectively associated with two camshaft toothed wheels as claimed in claim 1, wherein the crankshaft toothed wheel and each camshaft toothed wheel are angularly set such that a marker (GAP) of the crankshaft toothed wheel is arranged at a first position corresponding to a space between the first recessed part and a next first edge of each camshaft toothed wheel, and/or at a second position corresponding to a space between the first tooth and a next first edge of each camshaft toothed wheel, and wherein the computer comprises an engine synchronization algorithm adapted to recognize sequences formed by the series of teeth and the respective recessed parts of each camshaft toothed wheel, and to compare the sequences to the marker (GAP) of the crankshaft toothed wheel so as to determine an engine position in real time.

20. A method of synchronization between a crankshaft signal supplied by a crankshaft sensor associated with a crankshaft toothed wheel, and a camshaft signal supplied by a "True Power On" (TPO)-type camshaft sensor associated with the camshaft toothed wheel of claim 1, the method comprising:

during a first revolution of the camshaft toothed wheel upon starting an engine, operating the camshaft sensor with a first sensitivity in which the camshaft sensor is unable to detect the first recessed part nor the first tooth, comparing a first camshaft signal obtained during the first revolution to a first stored signal model corresponding to a first target wheel with six teeth, including one tooth with a greater angular length than an angular length of remaining teeth, and six recessed parts, including one recessed part with a greater angular length than an angular length of remaining recessed parts, during subsequent revolutions of the camshaft toothed wheel, operating the camshaft sensor with a second sensitivity greater and more precise than the first sensitivity in which the camshaft sensor is enabled to detect the first recessed part as well as the first tooth, comparing a second camshaft signal obtained during the subsequent revolutions to a second stored signal model corresponding to a second target wheel including eight teeth with falling edges evenly distributed about an outer periphery of the second target wheel, and synchronizing the engine in real time by combining the comparing of each camshaft signal with a respective crankshaft signal.

* * * * *